United States Patent [19]

F'Geppert

[11] Patent Number: 4,782,716
[45] Date of Patent: Nov. 8, 1988

[54] ROLLER BEARING GEAR SYSTEM

[75] Inventor: Erwin F'Geppert, Oakland County, Mich.

[73] Assignee: The United States of America as represented by the Secretary of the Army, Washington, D.C.

[21] Appl. No.: 434,792

[22] Filed: Oct. 15, 1982

[51] Int. Cl.$^4$ .................. F16H 1/16; F16H 55/22
[52] U.S. Cl. ................................ 74/425; 74/458
[58] Field of Search .............. 74/425, 427, 458, 457, 74/464, 465

[56] References Cited

U.S. PATENT DOCUMENTS

| | | | |
|---|---|---|---|
| 219,706 | 9/1879 | Flynn | 74/458 |
| 1,421,580 | 7/1922 | Seemann | 74/458 |
| 1,603,557 | 10/1926 | Schleier | 74/427 |
| 2,520,784 | 8/1950 | Schlicksupp | 74/798 |
| 2,714,315 | 8/1955 | Reader et al. | 74/458 |
| 3,190,138 | 6/1965 | MacChesney | 74/425 |
| 3,398,590 | 8/1968 | Campbell et al. | 74/425 |
| 3,468,179 | 9/1969 | Sedgwick et al. | 74/425 |
| 3,489,026 | 1/1970 | Bond | 74/425 |
| 3,494,215 | 2/1970 | Fengler | 74/425 |
| 3,495,470 | 2/1970 | McCartin | 74/425 |
| 3,597,990 | 5/1970 | McCartin | 74/425 |
| 3,648,535 | 3/1972 | Maroth | 74/465 |
| 3,820,413 | 6/1974 | Brackett | 74/425 |
| 4,006,646 | 2/1977 | F'Geppert | 74/425 |
| 4,023,433 | 5/1977 | Schutz | 74/425 |

FOREIGN PATENT DOCUMENTS

| | | | |
|---|---|---|---|
| 1041315 | 10/1958 | Fed. Rep. of Germany | 74/425 |
| 1127162 | 4/1962 | Fed. Rep. of Germany | 74/425 |
| 2421836 | 11/1975 | Fed. Rep. of Germany | 74/425 |
| 613793 | 11/1926 | France | 74/425 |
| 126464 | 6/1928 | France | 74/425 |
| 1110072 | 2/1956 | France | 74/458 |
| 459770 | 10/1950 | Italy | 74/458 |
| 0670758 | 6/1974 | U.S.S.R. | 74/427 |

Primary Examiner—Lawrence J. Staab
Attorney, Agent, or Firm—Peter A. Taucher; David L. Kuhn

[57] ABSTRACT

An anti-friction worm-wheel assembly wherein the anti-friction elements are rollers carried by the worm element. The rollers sequentially move through grooves in the edge surface of the wheel element to transmit drive forces from one element to the other. Aims of the invention are to achieve rolling contact of the anti-friction elements on the groove surfaces, relatively high load-handling capability, and a relatively simple low cost structure.

1 Claim, 2 Drawing Sheets

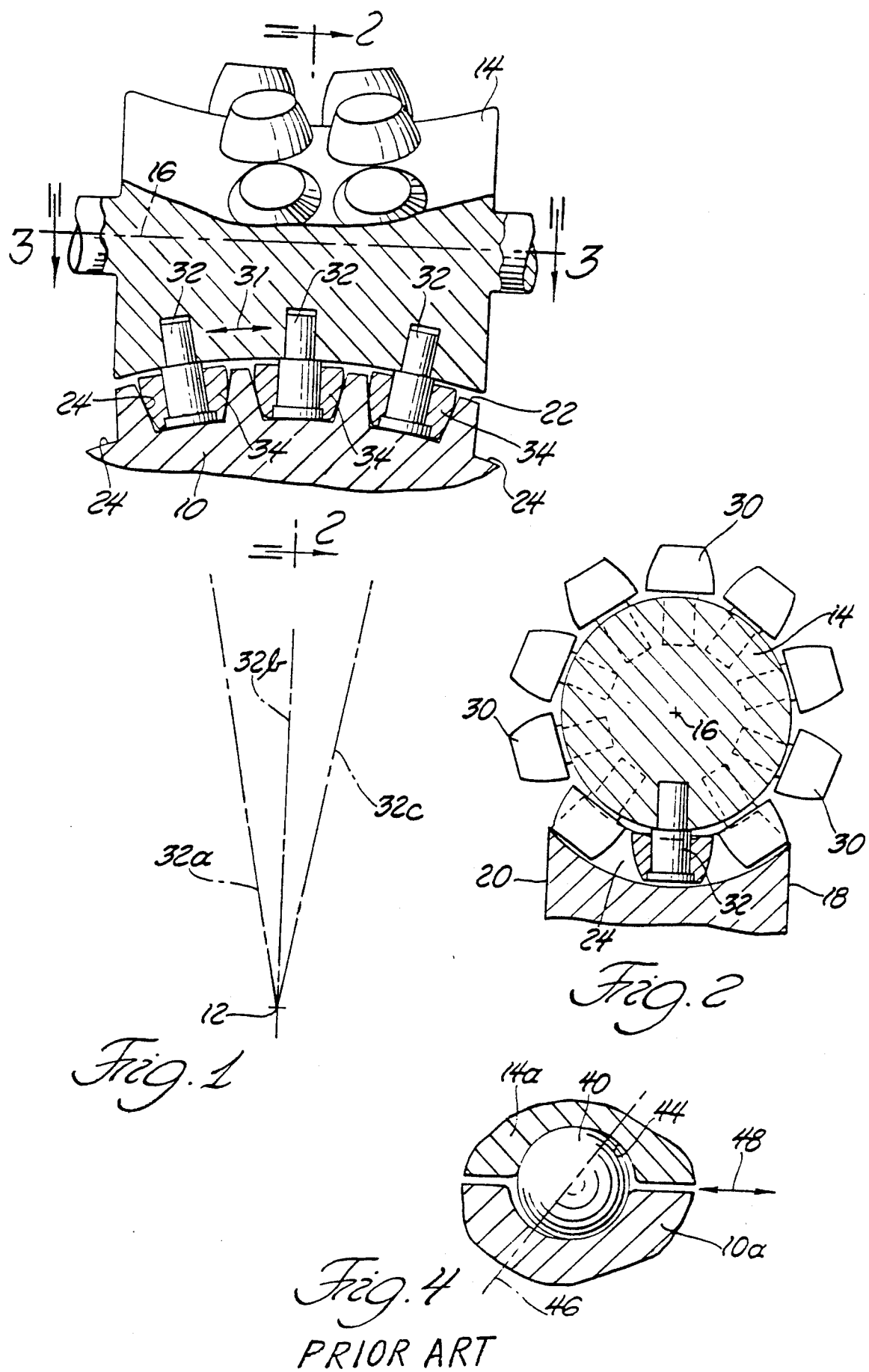

ROLLER BEARING GEAR SYSTEM

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to anti-friction gearing, especially gearing that utilizes rollers as anti-friction elements. The inventive concept is particularly applicable to worm-wheel gearing, although it may also have application to rotary screw-nut systems or worm-rack systems. General objects of the invention are to provide an anti-friction gearing system that achieves rolling contact of the drive elements, relatively small frictional losses, relatively long service life, minimal noise generation, relatively high load-handling capability, and two-movement direction capability. In the case of worm-wheel gear systems an additional object is to achieve a relatively great speed change between the drive and driven members.

U.S. Pat. Nos. disclosing inventions having general similarities to the instant invention are MacChesney 3,190,138; Sedgwick et al. 3,468,179; Bond 3,489,026; F'Geppert 4,006,646; and Schutz 4,023,433. These patented inventions use ball type anti-friction elements, whereas the present invention contemplates the use of roller type anti-friction elements. Another difference between my invention and most of the prior art inventions is the fact that in my proposed arrangements the anti-friction rollers rotate on fixed rotational axes whereas in the prior art arrangements the anti-friction elements recirculate through endless grooves or passages. I consider my arrangements to be simpler than the prior art.

THE DRAWINGS

FIG. 1 is a fragmentary sectional view through a worm-wheel assembly embodying my invention.

FIG. 2 is a sectional view taken on line 2—2 in FIG. 1.

FIG. 4 is a fragmentary view illustrating the action of a conventional ball-groove type gear system.

Figure 5:
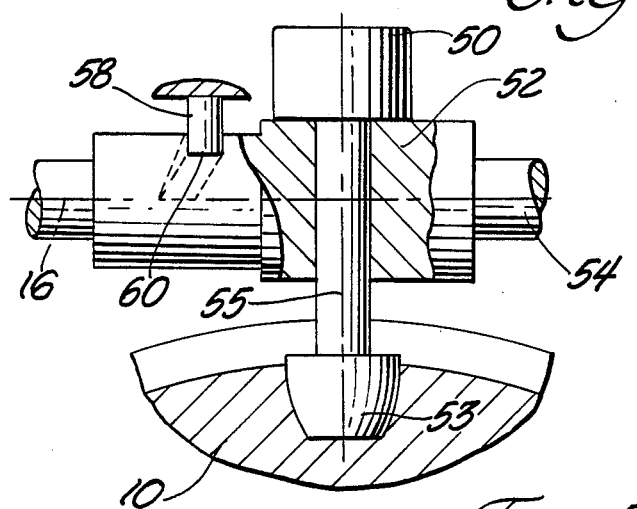

FIG. 5 schematically illustrates a cutting tool mechanism for machining grooves in the wheel member of the FIG. 1 worm-wheel assembly.

Figure 6:
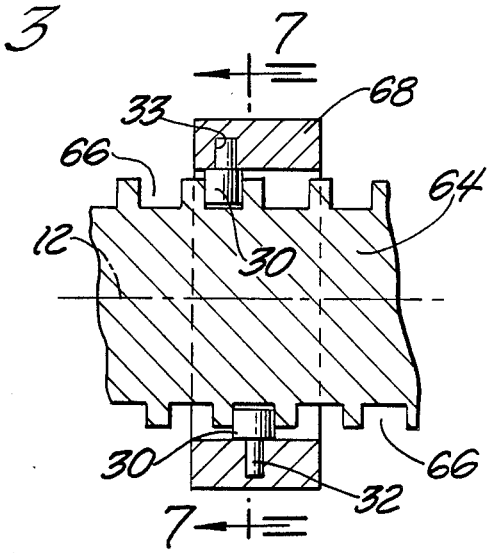

FIG. 6 is a fragmentary section view through a nut-screw assembly embodying my inventive concept.

Figure 7:
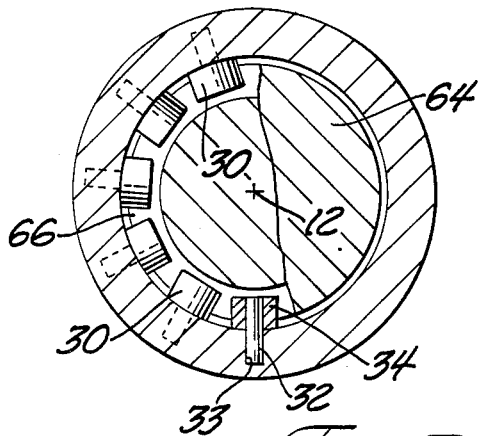

FIG. 7 is a sectional view taken generally on line 7—7 in FIG. 6.

Figure 8:
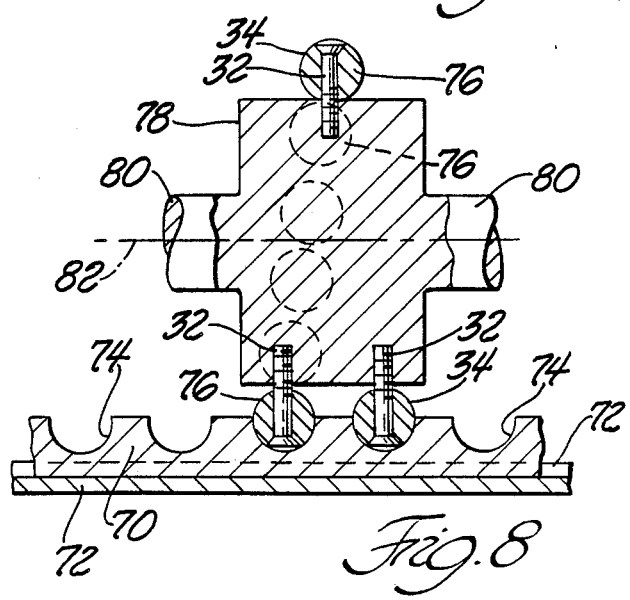

FIG. 8 is a fragmentary sectional view through an anti-friction gear and rack assembly embodying my invention.

Figure 3:
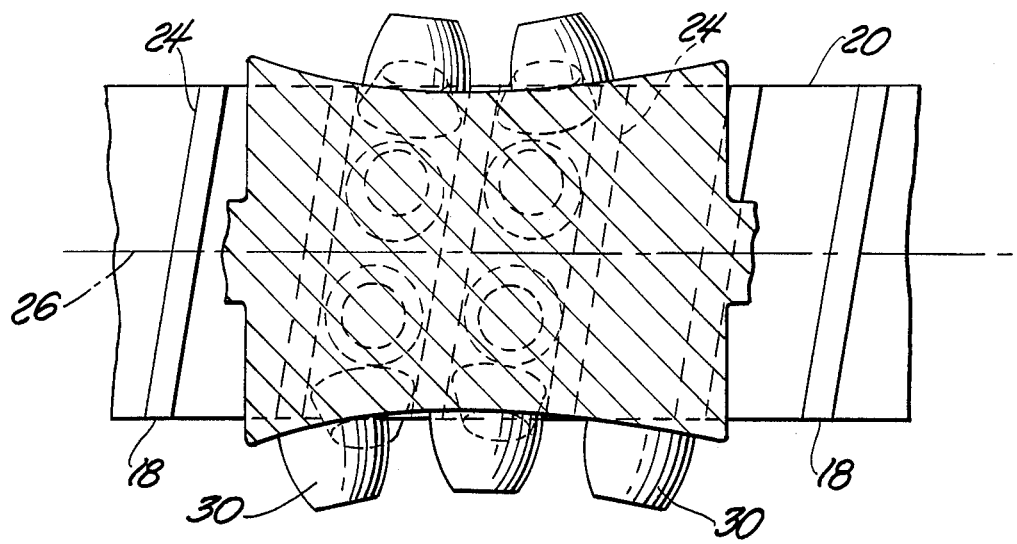
FIG. 3 is a sectional view taken on line 3—3 in FIG. 1.

Referring more particularly to FIGS. 1 through 3, there is shown an anti-friction worm-wheel assembly comprising a relatively large diameter wheel 10 mounted for rotation around a first axis 12, and a relatively small diameter worm body 14 mounted for rotation around a second axis 16. Bearings for the necessary support shafts are not shown.

Wheel 10 has two flat end faces 18 and 20, and a circular edge surface 22. As shown in FIG. 2, surface 22 has a concave transverse curvature that conforms to the surface contour of worm body 14. In turn, the worm body has an hourglass profile (FIG. 1) that conforms to the circular edge profile defined by surface 22. A series of regularly spaced grooves 24 are formed in edge surface 22 of the wheel. As seen in FIG. 2, a representative groove 24 is of constant depth from end face 18 to end face 20. As seen in FIG. 3, each groove 24 is angled acutely to the mid plane 26 of wheel 10; the angulation is related to the helical pitch angle of helically-arranged rollers 30 carried by worm body 14.

Each roller 30 comprises a post or pin 32 suitably anchored in worm body 14, as by means of a press fit in a machined hole or socket. A roller sleeve 34 is freely rotatable on each post 32 for rotation around the post axis. The various posts extend normal to the surface of body 14; the posts are oriented so that when the rollers are located in grooves 24 midway between end faces 18 and 20 the post axes intersect the axis 12 of wheel 10. FIG. 1 shows three representative posts 32 having axis lines 32a, 32b and 32c intersecting wheel axis 12.

Rollers 30 are arranged on worm body 14 in a helical pattern extending around the worm body surface. Preferably there is a sufficient number of rollers to provide at least two complete helical rows of rollers. It is desired that the helix angle of the roller pattern correspond to the acute angulation of grooves 24 in order that the rollers in both rows of rollers are ensured of simultaneous entry into adjacent ones of grooves 24. The hourglass contour of worm body 14 enables the various rollers 30 to project from body 14 the necessary distances for simultaneous penetration into adjacent ones of grooves 24; however the hourglass configuration of body 14 can cause an adverse distortion of the roller pattern helix angle if the rollers in each helical row are evenly spaced. If we assume a constant spacing of the rollers in each helical row, then at the midpoint of the worm body (where the body diameter is relatively small) there would be a relatively small number of rollers in each helical row; near the ends of the worm body (where the body diameter is relatively large) there would be a relatively large number of rollers in each helical row. An even spacing of the rollers tends to make the helix pitch angle large near the ends of the worm body and small at the midpoint of the worm body. Therefore, I contemplate that the roller spacing will be large near the worm body ends and small near the worm body midpoint, whereby the helix pitch angle of the roller pattern is constant along the entire helical length of the roller assembly. With such an arrangement the rollers in adjacent helical rows will be ensured of simultaneous entry into grooves 24 without binding or play.

If it is desired to have a constant roller spacing in each helical row then the helix angle should be slightly lessened near the midpoint of the hourglass profile in order to ensure simultaneous entry of the rollers in each row into grooves 24.

The use of rollers, as shown in FIGS. 1 through 3 is believed advantageous over the recirculating ball concept already known in the art. In a prior art arrangement, represented fragmentarily by FIG. 4, a train of balls 40 recirculates in two semicircular cross sectioned grooves 42 and 44 formed respectively in wheel 10a and worm body 14a. One problem with the FIG. 4 ball system in that worm body 14a moves normal to the plane of the paper, whereas wheel 10a moves in the plane of the paper. The different movement directions taken by members 10a and 14a cause the balls to skid rather than roll, thus producing undesired friction, heat, and noise. Another problem with the FIG. 4 system is that the nominal rotational axis 46 of the individual balls is at an acute angle to the direction of ball loading represented by numeral 48; unit forces are higher than might otherwise be desired.

My system, as illustrated in FIGS. 1 through 3, alleviates some of the problems associated with the FIG. 4 prior art recirculating ball system. As regards the skid problem, it should be noted that rollers 30 engage only one pressure surface, i.e., a side surface of groove 24. The roller-groove relationship achieves a rolling type contact rather than the skid type engagement associated with the FIG. 4 arrangement. It is also noted that the roller side surface is substantially normal to the direction of load represented by numeral 31; effective unit load forces on the rollers should be less than in the FIG. 4 system.

A further point of interest is the capability of each roller 30 to extend a substantial distance into grooves 24. The rollers can be relatively long in axial directions for achieving a high load-carrying ability. By contrast, the penetration of a ball 40 (FIG. 4) into the groove in the wheel is limited to a maximum of one ball radius. In order to use deep grooves and deep ball penetration it is necessary to use relatively large diameter balls and groove cross sections. Sometimes this is not practicable.

I prefer to use a relatively large diameter post 32, commensurate with roller length and the expected load. Post diameter should be at least approximately one half the roller outside diameter. The axial length of the roller is preferably approximately the same as the roller outside diameter. In the illustrative structure of Figs. 1 through 3 the roller length is slightly less than the roller outside diameter.

The groove 24 cross section is preferably similar to the roller 30 profile, with sufficient clearance to permit roller rotation around the post 32 axis. Various machining procedures could be used to form grooves 24 to the desired contour, depth and direction. FIG. 5 schematically illustrates one possible machining system that can be used. A motor 50 is positioned on a head 52 for rotating a router type cutter 53 around shaft axis 55. Head 52 includes shafts 54 that extend into suitable bearings, not shown; head 52 can be rotated around the shaft 54 axis 16 by a nonillustrated power device to cause cutter 53 to traverse the edge area of wheel 10. A cam pin or roller 58 extends into a slot 60 in head 52 to shift head 52 along axis 16 as it is being rotated. Slot 60 direction is preselected to produce the desired angulation of each groove 24 relative to the wheel mid plane 26 (FIG. 3). Wheel 10 is intermittently indexed around its axis to achieve the desired groove 24 spacing.

I previously indicated that my inventive concept could be employed in various types of gear systems. FIGS. 6 and 7 show the invention applied to an anti-friction screw and nut assembly; bearings, not shown, mount screw 64 for rotation around axis 12. Screw 64 has helical grooves 66 extending around its surface for engagement with rollers 30 carried by nut 68. Each roller includes a pin 32 anchored in a socket 33 in nut 68, and a roller sleeve 34 rotatably positioned on the exposed portion of the pin. There are a sufficient number of rollers to form at least one helical row of rollers. Rotation of screw 64 around its axis 12 causes nut 68 to move along the screw.

FIG. 8 shows a variant of the invention, comprising a toothed rack 70 mounted in a fixed guide 72 for movement therealong. Grooves 74 in the rack receive spherical rollers 76 carried by a cylindrical head 78. Each roller 76 includes a post 32 anchored to head 78 and a roller sleeve 34 rotatably positioned on the post. Head 78 includes shafts 80 that extend into nonillustrated bearings, for enabling the head to rotate around shaft axis 82. Rollers 76 are arranged in a helical pattern around the surface of head 78, such that rotation of the head on axis 82 enables rollers 76 to interact with grooves 74 for advancing rack 70 along guide 72.

My invention is concerned primarily with the worm-wheel assembly shown in FIGS. 1 through 3. The structure shown in FIGS. 6 through 8 are considered variants of the invention that may be found useful for certain special applications where it is desired to translate a rotational input force into a linear output motion, with minimum frictional loss. As applied to the worm-wheel environment the invention achieves a very large speed change between the input and output shafts; the anti-friction nature of the drive system permits the drive to be from worm 14 to wheel 10 or from wheel 10 to worm 14. The individual rollers are engageable with the groove side surface in essentially true rolling contact, without the skid action that occurs with conventional recirculating ball systems. Roller pressure surfaces are loaded approximately in directions normal to the roller rotation axis for achieving good load-carrying capabilities. Load handling is further enhanced due to the fact that the worm body has at least two helical rows of rollers adapted to simultaneously operate in adjacent ones of the wheel grooves 24.

I wish it to be understood that I do not desire to be limited to the exact details of construction shown and described for obvious modifications will occur to a person skilled in the art.

I claim:

1. An anti-friction worm-wheel assembly comprising a relatively large diameter wheel having a first rotational axis, and a relatively small diameter worm having a second rotational axis extending at right angles to the first axis in non-intersecting relationship; said wheel having a circular peripheral edge surface (22) and two end faces (18 and 20); said wheel having regularly spaced grooves in its peripheral edge surface, acutely angled to the planes defined by the wheel end faces; said worm comprising a circular hourglass body and a plurality of similarly-dimensioned rollers projecting from said body for sequential reception in the aforementioned grooves, for thereby transmitting a driving force between the worm and wheel; each roller including post means mounting the roller for rotation around an imaginary axis that radiates from the worm rotational axis and is normal to the surface of the worm body; each roller comprising a roller sleeve freely rotatable on the associated post means; said worm body having an hourglass profile conforming to the edge surface contour of the wheel in a radial plane coincident with the worm body rotational axis; the peripheral edge surface of the wheel being concave in radial plane coincident with the wheel rotational axis; the concave edge surface on the wheel having a radius of curvature conforming to the worm body surface contour such that the wheel edge surface is uniformly spaced from the worm body surface at all points therealong within the axial length confines of the worm body; the rollers being arranged in a multi-row helical pattern extending around the worm body surface; the number of rollers being sufficient to provide at least two complete helical rows of rollers around the worm body; the rollers being spaced closely together on the worm body; the spacing of the rollers within each helical row being slightly varied in accordance with the hourglass profile dimension of the worm body, the variation in roller spacing being such that the rollers are more widely spaced near the ends of the worm body and less widely spaced at the midpoint of the worm body, to maintain a constant pitch distance from one helical row of rollers to the next helical row of rollers; the aforementioned grooves in the wheel periphery being of uniform depth from one end face of the wheel to the other end face of the wheel, whereby each roller within the wheel plane has its entire axial dimension in a groove; the wheel having a sufficient axial dimension, measured between its two end faces, such that each groove in the wheel edge surface is capable of simultaneously accommodating at least three rollers in driving relationship.

* * * * *